United States Patent
Taudt et al.

(10) Patent No.: US 9,851,065 B2
(45) Date of Patent: Dec. 26, 2017

(54) OPTICAL ELEMENT FOR A VEHICLE HEADLIGHT WITH FIRST AND SECOND PRIMARY OPTICAL ARRAYS FIXED TO EACH OTHER FORMING AN ARRAY

(71) Applicants: DOCTER OPTICS SE, Neustadt an der Orla (DE); ZIZALA LICHTSYSTEME GMBH, Wieselburg (AT)

(72) Inventors: Lukas Taudt, Ferschnitz (AT); Andreas Moser, Haag (AT); Wolfram Wintzer, Jena (DE); Lars Arnold, Neustadt (DE); Alois Willke, Buseck (DE); Sandro Plietzsch, Linda (DE)

(73) Assignee: Docter Optics SE, Neustadt an der Orla (DE)

( * ) Notice: Subject to any disclaimer, the term of this patent is extended or adjusted under 35 U.S.C. 154(b) by 134 days.

(21) Appl. No.: 14/897,146

(22) PCT Filed: May 27, 2014

(86) PCT No.: PCT/EP2014/001425
§ 371 (c)(1),
(2) Date: Dec. 9, 2015

(87) PCT Pub. No.: WO2014/202177
PCT Pub. Date: Dec. 24, 2014

(65) Prior Publication Data
US 2016/0146416 A1    May 26, 2016

(30) Foreign Application Priority Data

Jun. 18, 2013  (DE) .......................... 10 2013 010 112
Mar. 12, 2014  (DE) .......................... 10 2014 003 526
May 15, 2014  (DE) .......................... 10 2014 007 185

(51) Int. Cl.
*F21S 8/10*   (2006.01)
*C03B 11/08*  (2006.01)
(Continued)

(52) U.S. Cl.
CPC .... *F21S 48/1241* (2013.01); *B29D 11/00663* (2013.01); *C03B 11/08* (2013.01);
(Continued)

(58) Field of Classification Search
CPC .............. F21S 48/1241; F21S 48/1225; G02B 19/0028; G02B 6/0075; G02B 6/0076;
(Continued)

(56) References Cited

U.S. PATENT DOCUMENTS 8,684,765 B2 *  4/2014  Shirk ................... G02B 6/0008
                                                     362/551
2006/0067090 A1  3/2006  Lee
(Continued)

FOREIGN PATENT DOCUMENTS

DE        10231326       2/2004
DE        102007035021   1/2009
(Continued)

OTHER PUBLICATIONS

Office Action dated Jun. 12, 2015 in German Application No. 102014007185.5.
(Continued)

*Primary Examiner* — Robert May
(74) *Attorney, Agent, or Firm* — Barnes & Thornburg LLP (57) ABSTRACT

The invention relates to an optical element for a vehicle headlight, in particular a motor vehicle headlight, having a first head lens array which is a compressed as a single piece from a transparent material and at least one second head lens array which is compressed as a single piece from the same
(Continued)

or another transparent material. Said first head lens array and the second head lens array have respectively a connecting web which connects the at least one first head lens to a second head lens.

9 Claims, 6 Drawing Sheets

(51) Int. Cl.
- *G02B 19/00* (2006.01)
- *F21V 8/00* (2006.01)
- *B29D 11/00* (2006.01)

(52) U.S. Cl.
 CPC .......... *C03B 11/082* (2013.01); *G02B 6/0045* (2013.01); *G02B 19/0028* (2013.01); *C03B 2215/412* (2013.01); *C03B 2215/414* (2013.01); *C03B 2215/79* (2013.01)

(58) Field of Classification Search
 CPC ..... G02B 6/0078; G02B 6/0045; F21V 5/007; F21Y 2105/00; F21Y 2105/10; F21Y 2105/12; F21Y 2105/14; F21Y 2105/16; F21Y 2105/18
 USPC .......................................... 362/551, 555, 511
 See application file for complete search history.

(56) References Cited

U.S. PATENT DOCUMENTS

| | | |
|---|---|---|
| 2006/0119781 A1 | 6/2006 | Godo |
| 2009/0016074 A1 | 1/2009 | Dolson |

FOREIGN PATENT DOCUMENTS

| | | |
|---|---|---|
| DE | 102008033383 | 1/2010 |
| EP | 2280215 | 7/2010 |
| WO | 2007027474 | 3/2007 |
| WO | 2009117834 | 10/2009 |

OTHER PUBLICATIONS

International Search Report and Written Opinion, Application No. PCT/EP2014/001425, dated Oct. 14, 2014.

\* cited by examiner

Fig. 12

OPTICAL ELEMENT FOR A VEHICLE HEADLIGHT WITH FIRST AND SECOND PRIMARY OPTICAL ARRAYS FIXED TO EACH OTHER FORMING AN ARRAY

CROSS REFERENCE TO RELATED APPLICATIONS

This application is a U.S. nationalization under 35 U.S.C. §317 of International Application No. PCT/EP2014/001425, filed May 27, 2014, which claims priority to German Application Nos. 102013010112.3 filed Jun. 18, 2013, 102014003526.3.filed Mar. 12, 2014, and 102014007185.5 filed May 15, 2014.

The invention refers to a vehicle headlight and/or an optical element for a vehicle headlight, respectively.

DE 10 2009 020 619 A1 discloses an illumination apparatus including a plurality of light diodes which form a light diode field which is configured by at least two lines of light diodes arranged linearily side by side, and including an optical field which is arranged in the path of the beams of the light emitted by the light diodes and includes a number of optical imaging elements each associated with at least one light diode. Herein, a first line of the light diode field includes light diodes which are stronger with regard to their light intensity than at least a second line, and first optical imaging elements are associated with the light diodes which have other optical characteristics than second optical imaging elements, which are associated with the light diodes of the at least one second line of the light diode field. A single element of a line of imaging elements according to DE 10 2009 020 619 A1 forms a primary optic.

DE 10 2005 054 955 A1 discloses a light emitting module including at least two light sources mounted on a common carrier. Herein, at least one of the light sources comprises at least two light diode chips. A primary optic referred to as optical body is subordinated to and arranged downstream of each light source of the module.

DE 10 2005 049 685 A1 discloses a motor vehicle headlight module including at least two light units, to each of which a supplemental optic device designated as primary optic is subordinated.

EP 2 518 397 A2 discloses a light module of a motor vehicle for generating a spot distribution of an upper beam light distribution, the latter being formed by superimposing the spot distribution and a basic distribution generated by at least one other module, wherein the light module is the subdivided into several separately controllable sub-modules, these sub-modules generating several strip-shaped segments of the spot distribution, wherein the strip-shaped segments complement one another to form the spot distribution.

It is, in particular, an object of the invention to suggest an improved optic for a vehicle headlight, in particular for a motor vehicle headlight. It is a further object of the invention to reduce the costs for manufacturing vehicle headlights. It is a further object of the invention to reduce the costs for manufacturing motor vehicles. It is, moreover, desirable to obtain a soft gradient in the transition region from an illuminated or lighted area to a non-illuminated or non-lighted area.

The aforementioned object is achieved by an optical element for a vehicle headlight, in particular for a motor vehicle headlight, including a monolithically pressed (molded) first primary optic array (supplemental optic element arrangement) of transparent material, advantageously of inorganic glass, and at least one monolithically pressed (molded) second primary optic array of the said or of a transparent material, advantageously of inorganic glass, wherein the first primary optic array comprises
 a first primary optic including a light entry face and a light exit face,
 at least one second primary optic including a light entry face and a light exit face, and
 a first connection web connecting the first primary optic mechanically to the second primary optic,
wherein the first primary optic comprises, on its side facing away from or opposing, respectively, the first connection web, a first web prolongating (or extending), in particular, the light exit face of the first primary optic, wherein the second primary optic comprises, on its side facing away from or opposing, respectively, the first connection web, a second web prolongating or extending), in particular, the light exit face of the second primary optic, wherein the second primary optic array comprises
 a third primary optic including a light entry face and a light exit face,
 at least one fourth primary optic including a light entry face and a light exit face, and
 a second connection web connecting the third primary optic mechanically to the fourth primary optic,
and wherein the first primary optic array and the second primary optic array are positioned and fixed with respect to each other such that they engage with each other such as to form an array, in which
 the second primary optic is arranged between the third primary optic and the fourth primary optic, and
 the third primary optic is arranged between the first primary optic and the second primary optic.

In the sense of the invention, a web and/or a connection web, respectively, is/are not directly lighted and/or tightly focussed at being specifically illuminated by light entering through the light entry face of the primary optic. However, it may be provided for that portions of scattered or diffused light impinge at the interior of a web and/or a connection web, respectively. In the sense of the invention, web and/or a connection web, respectively, is/are not directly connected to the light entry face of a primary optic. In the sense of the invention, a web is, in particular, configured (particularly in the proximity of the light exit face of the primary optic) according to a connection web, however without any connection to a further primary optic being brought about.

In the sense of the invention, an optically effective light entry (sur-)face and/or an optically effective light exit (sur-)face, respectively, is/are an optically effective surface. In the sense of the invention, an optically effective (sur-)face is, in particular, a surface at which, when using the primary optic according to its purpose, light will be refracted. In the sense of the invention, an optically effective surface is, in particular, a surface at which, when using the primary optic according to its purpose, the direction of light which passes through this surface will be changed.

In the sense of the invention, transparent material is in particular glass. Transparent material, in the sense of the invention, is particularly inorganic glass. In the sense of the invention, transparent material is particularly silicate glass. In the sense of the invention, transparent material is particularly glass as described in PCT/EP2008/010136. In the sense of the invention, glass particularly comprises
 0.2 to 2% by weight $Al_2O_3$,
 0.1 to 1% by weight $Li_2O$,
 0.3, in particular 0.4 to 1.5% by weight $Sb_2O_3$,
 60 to 75% by weight $SiO_2$,
 3 to 12% by weight $Na_2O$, 3 to 12% by weight $K_2O$, and
3 to 12% by weight CaO.

In the sense of the invention, a primary optic (or supplemental optical device) may be a light tunnel or a light guide/light conduct(or), respectively. In the sense of the invention, a primary optic, in particular, serves for aligning light which is irradiated into the light entry face, wherein it is particularly provided for that (accordingly) aligned light will exit through the light exit (sur-)face.

In an advantageous embodiment of the invention, the first primary optic, the second primary optic, the third primary optic and/or the fourth primary optic comprise/s, between its/their respective light entry face/s and its/their light exit face/s, a press-molded surface, in particular for the total reflection of light irradiated into the light entry surface.

In a further advantageous embodiment of the invention, the distance
between the second primary optic and the third primary optic amounts to no more than 0.5 mm;
between the second primary optic and the fourth primary optic amounts to no more than 0.5 mm; and/or
between the first primary optic and the third primary optic amounts to no more than 0.5 mm.

In a further advantageous embodiment of the invention, the third primary optic array comprises, on its side facing away from or opposing, respectively, the second connection web, a third web extending or prolongating, in particular, the light exit face of the third primary optic. In a further advantageous embodiment of the invention, the fourth primary optic array comprises, on its side facing away from or opposing, respectively, the second connection web, a fourth web extending or prolongating, in particular, the light exit face of the fourth primary optic.

The aforementioned object is, moreover, achieved by an optical element for a vehicle headlight, in particular a motor vehicle headlight, including a monolithically pressed (molded) first primary optic array of transparent material, advantageously of inorganic glass, including (further) a monolithically pressed (molded) second primary optic array of the said or of a transparent material, advantageously of inorganic glass, and including (still further) at least one monolithically pressed (molded) third primary optic array of the said or of a transparent material, advantageously of inorganic glass,
wherein the first primary optic array comprises
  a first primary optic including a light entry face and a light exit face,
  at least one second primary optic including a light entry face and a light exit face, and
  a first connection web connecting the first primary optic mechanically to the second primary optic,
wherein the second primary optic array comprises
  a third primary optic including a light entry face and a light exit face,
  at least one fourth primary optic including a light entry face and a light exit face, and
  a second connection web connecting the third primary optic mechanically to the fourth primary optic,
wherein the third primary optic array comprises
  a fifth primary optic including a light entry face and a light exit face,
  at least one sixth primary optic including a light entry face and a light exit face, and
  a third connection web connecting the fifth primary optic mechanically to the sixth primary optic,
wherein the first primary optic array, the second primary optic array, and the third primary optic array are positioned and fixed with respect to each other such that they engage with each other such that they form an array, in which
  the first primary optic is arranged between the third primary optic and the fourth primary optic,
  the second primary optic is arranged between the fifth primary optic and the sixth primary optic, and
  the fourth primary optic and the fifth primary optic are arranged between the first primary optic and the second primary optic,
and wherein,
  on its side facing away from or opposing, respectively, the first connection web, the first primary optic comprises a first web extending or prolongating, in particular, the light exit face of the first primary optic, and/or
  on its side facing away from or opposing, respectively, the first connection web, the second primary optic comprises a second web extending or prolongating, in particular, the light exit face of the second primary optic, and/or
  on its side facing away from or opposing, respectively, the first connection web, the third primary optic comprises a third web extending or prolongating, in particular, the light exit face of the third primary optic, and/or
  on its side facing away from or opposing, respectively, the first connection web, the fourth primary optic comprises a fourth web extending or prolongating, in particular, the light exit face of the fourth primary optic, and/or
  on its side facing away from or opposing, respectively, the first connection web, the fifth primary optic comprises a fifth web extending or prolongating, in particular, the light exit face of the fifth primary optic, and/or
  on its side facing away from or opposing, respectively, the first connection web, the sixth primary optic comprises a sixth web extending or prolongating, in particular, the light exit face of the sixth primary optic.

In an advantageous embodiment of the invention, the distance
between the first primary optic and the third primary optic amounts to no more than 0.5 mm;
between the first primary optic and the fourth primary optic amounts to no more than 0.5 mm;
between the second primary optic and the fifth primary optic amounts to no more than 0.5 mm;
between the second primary optic and the sixth primary optic amounts to no more than 0.5 mm, and/or
between the fourth primary optic and the fifth primary optic amounts to no more than 0.5 mm.

In a further advantageous embodiment of the invention, the first primary optic, the second primary optic, the third primary optic, the fourth primary optic, the fifth primary optic, and/or the sixth primary optic comprise/s, between its/their light entry face/s and its/their light exit face/s, a bright- or press-molded surface, in particular for the total reflection of light irradiated into the light entry face.

In an advantageous embodiment of the invention, a vehicle headlight, in particular a motor vehicle headlight includes at least one aforementioned optical element as well as a light source arrangement/array comprising, in particular, an LED, for making light enter into the light entry face(s). In a further advantageous embodiment of the invention, the light source arrangement/array comprises at least one LED or one array of LEDs. In an advantageous embodiment of the invention, the light source array comprises at least one OLED or one array of OLEDs. For example, the light source arrangement/array may well also be an aerial luminous field. In an embodiment of the invention, a vehicle headlight, in particular a motor vehicle headlight, includes at least one aforementioned optical element as well as an optic/lens arranged downstream of the optical element, in particular for imaging the light exit faces.

In a further advantageous embodiment of the invention, a light entry face and/or a light exit face of a primary optic are pressed or press-molded, respectively.

In a further advantageous embodiment of the invention, a primary optic array (array of supplemental optical elements) comprises less than 10 primary optics (supplemental optical elements). In a further advantageous embodiment of the invention, a primary optic array includes 4 or 5 or 6 primary optics.

In a further advantageous embodiment of the invention, the distance of a primary optic of the first primary optic array to a neighbouring primary optic of the second primary optic array amounts to no more than 3.5 mm. In a further advantageous embodiment of the invention, the distance of a primary optic of the first primary optic array to a neighbouring primary optic of the second primary optic array amounts to no more than 1 mm. In a further advantageous embodiment of the invention, the distance of a primary optic of the first primary optic array to a neighbouring primary optic of the second primary optic array amounts to no more than 0.5 mm. In a further advantageous embodiment of the invention, the distance of a primary optic of the first primary optic array to a neighbouring primary optic of the second primary optic array amounts to 0.2 to 0.075 mm. In a further advantageous embodiment of the invention, the distance of a primary optic of the first primary optic array to a neighbouring primary optic of the second primary optic array amounts to no less than 0.05 mm.

In the sense of the invention, press-molding (also termed bright-pressing, blank-molding or blank-pressing) is to be interpreted to mean that an optically effective surface is to be pressed such that any subsequent post-treatment of the contours of this optically effective surface may be omitted/dispensed with / need not be provided for at all, respectively. Thus, it is, in particular, provided for that a press-molded surface need not be ground after press-molding.

In the sense of the invention, a motor vehicle is, in particular, a land vehicle for individual use in road traffic. In the sense of the invention, motor vehicles are particularly not restricted to land vehicles including a combustion engine.

Further details and combinations will become apparent from the drawwings. In this context, there is shown in FIG. 1 an example of embodiment of an optical element for a vehicle headlight or a motor vehicle headlight, respectively, by way of a top view.

Figure 1:
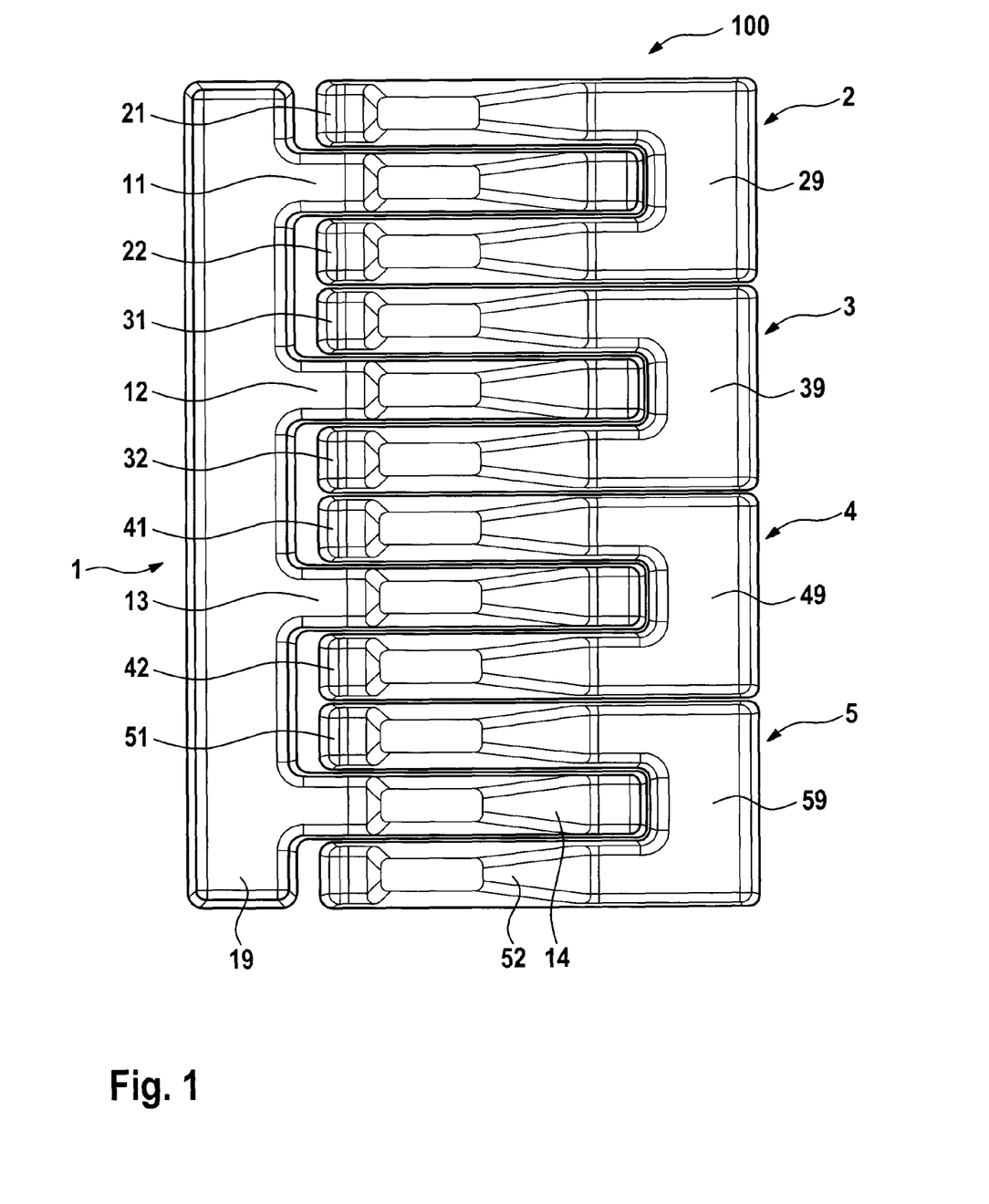

FIG. 1 shows an example of embodiment of an optical element 100 for a vehicle headlight or a motor vehicle headlight, respectively, by way of a top view. The optical element 100 comprises a monolithically pressed (molded) primary optic array 1 of inorganic glass, a monolithically pressed (molded) primary optic array 2 of inorganic glass, a monolithically pressed (molded) primary optic array 3 of inorganic glass, a monolithically pressed (molded) primary optic array 4 of inorganic glass, and a monolithically pressed (molded) primary optic array 5 of inorganic glass. The primary optic array 1 comprises a connection web 19, on which a primary optic 11 (also known as supplemental optic[al] device), a primary optic 12, a primary optic 13 and a primary optic 14 are arranged. The primary optic array 2 comprises a primary optic 21 and a primary optic 22 which are arranged on a connection web 29. The primary optic array 3 comprises a primary optic 31 and a primary optic 32 which are arranged on a connection web 39. The primary optic array 4 comprises a primary optic 41 and a primary optic 42 which are arranged on a connection web 49. The primary optic array 5 comprises a primary optic 51 and a primary optic 52 which are arranged on a connection web 59. Herein, the primary optics 21, 11, 22, 31, 12, 32, 41, 13, 42, 51, 14, and 52 are arranged, with respect to each other, such that they form an array, in which the primary optic 11 is arranged between the primary optics 21 and 22, the primary optic 12 is arranged between the primary optics 31 and 32, the primary optic 13 is arranged between the primary optics 41 and 42, the primary optic 14 is arranged between the primary optics 51 and 52, the primary optics 22 and 31 are arranged between the primary optics 11 and 12, the primary optics 32 and 41 are arranged between the primary optics 12 and 13, and the primary optics 42 and 51 are arranged between the primary optics 13 and 14.

Figure 2:
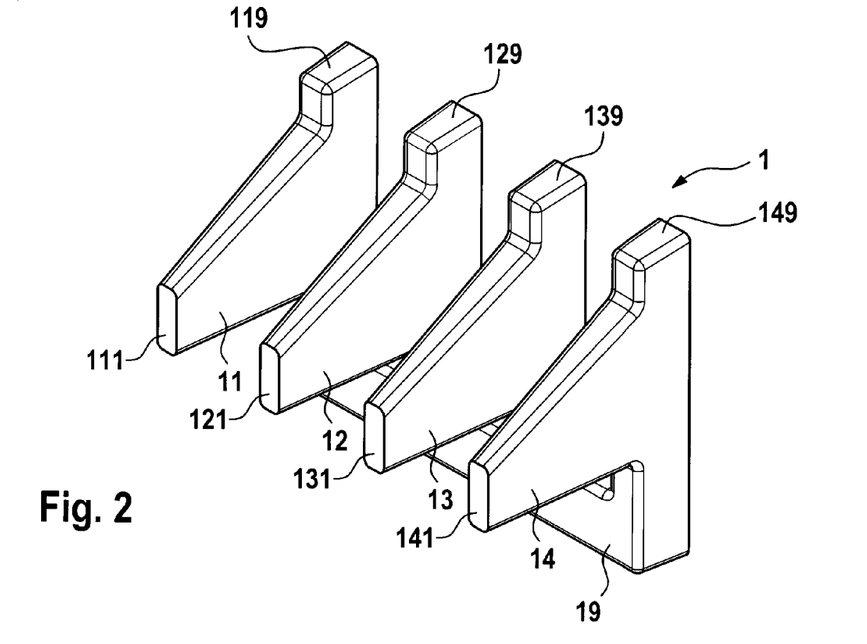
FIG. 2 a perspective representation of a primary optic array of the optical element according to FIG. 1.
Figure 3:
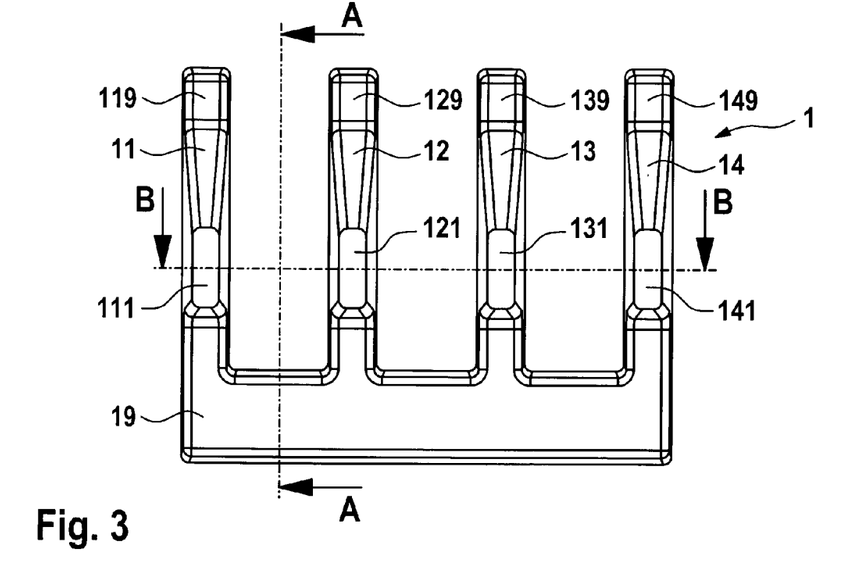
FIG. 3 the primary optic array according to FIG. 2 by way of a top view.
Figure 4:
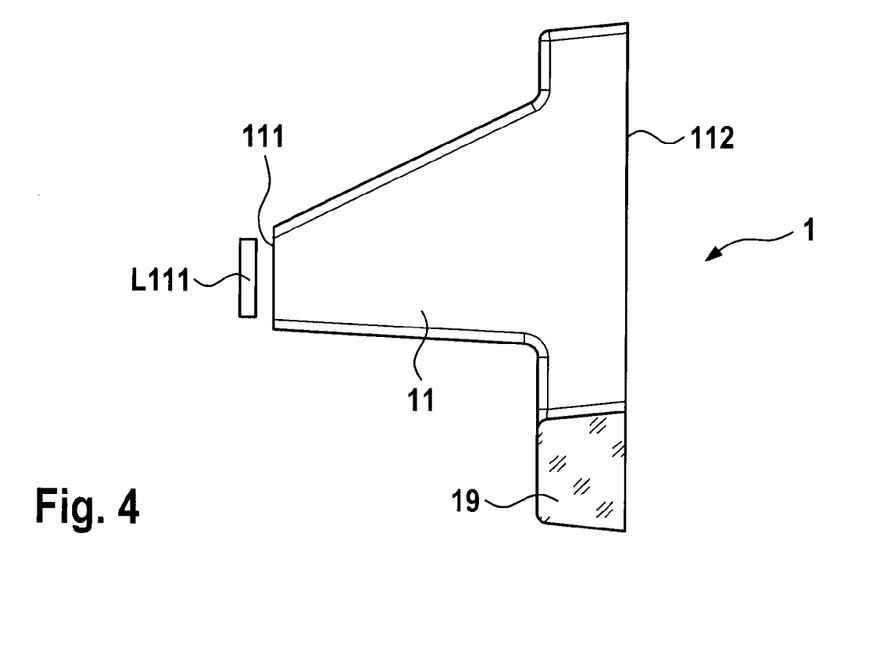
FIG. 4 the primary optic array according to FIG. 2 by way of cross-sectional representation along a section line A-A as represented in FIG. 3.
Figure 5:
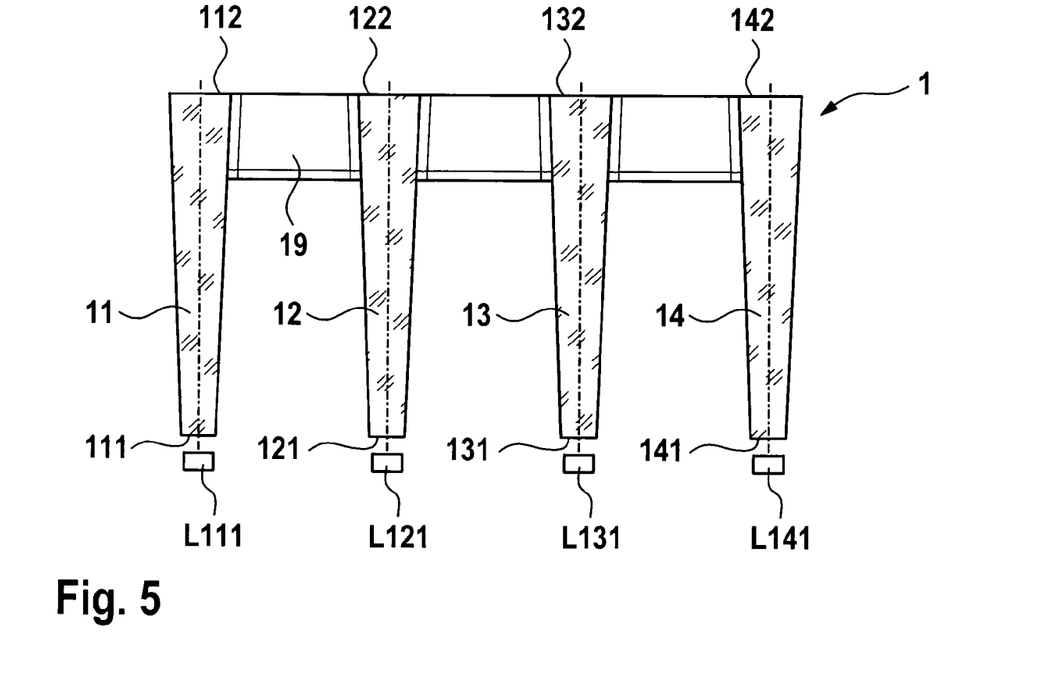
FIG. 5 the primary optic array according to FIG. 2, by way of a cross-section taken along section line B-B as shown in FIG. 3.

FIG. 2 shows the primary optic array 1 by way of a perspective representation. FIG. 3 shows the primary optic array 1 by way of a top view. FIG. 4 shows the primary optic array 1 by way of a cross sectional representation along the sectional line A-A represented in FIG. 3, and FIG. 5 shows the primary optic array 1 by way of a cross sectional representation along the sectional line B-B represented in FIG. 3. The primary optic 11 comprises a light entry face 111 and a light exit face 112 as well as a web 119, the latter being arranged on the side of the light exit face 112 facing away from the connection web 19 or opposing the side and the light exit face 112 or the primary optic 12, respectively, and extending or prolongating the light exit face 112. The primary optic 12 comprises a light entry face 121 and a light exit face 122 as well as a web 129, the latter being arranged on the side facing away from the connection web 19 or opposing the side of the light exit face 112 or the primary optic 11, respectively, and extending or prolongating the light exit face 122. The primary optic 13 comprises a light entry face 131 and a light exit face 132 as well as a web 139, the latter being arranged on the side facing away from the connection web 19 or opposing the side of the light exit face 132 or the primary optic 13, respectively, and extending or prolongating the light exit face 132. The primary optic 14 comprises a light entry face 141 and a light exit face 142 as well as a web 149, the latter being arranged on the side facing away from the connection web 19 or opposing the side the light exit face 142 or the primary optic 14, respectively, and extending or prolongating the light exit face 142.

Figure 6:
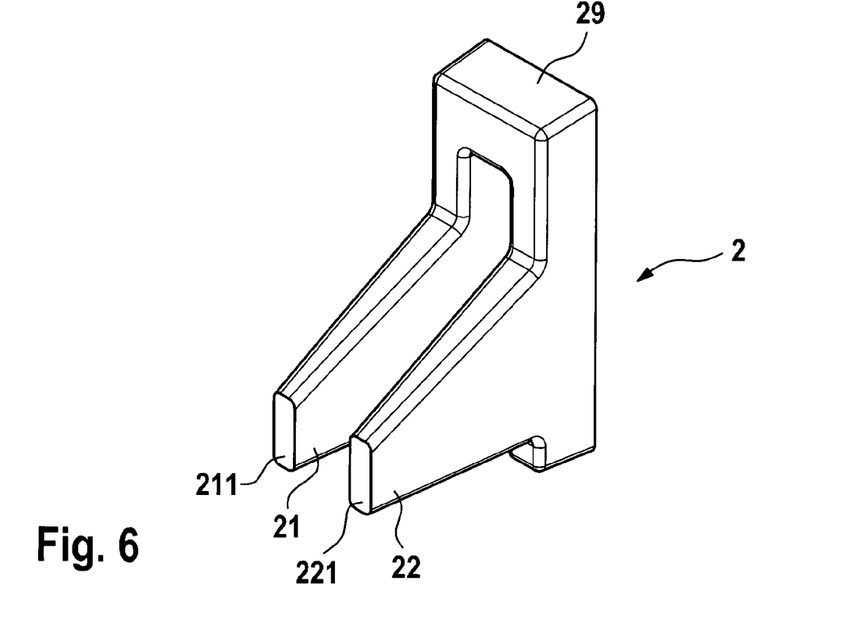
FIG. 6 a perspective representation of a further primary optic array of the optical element according to FIG. 1.
Figure 7:
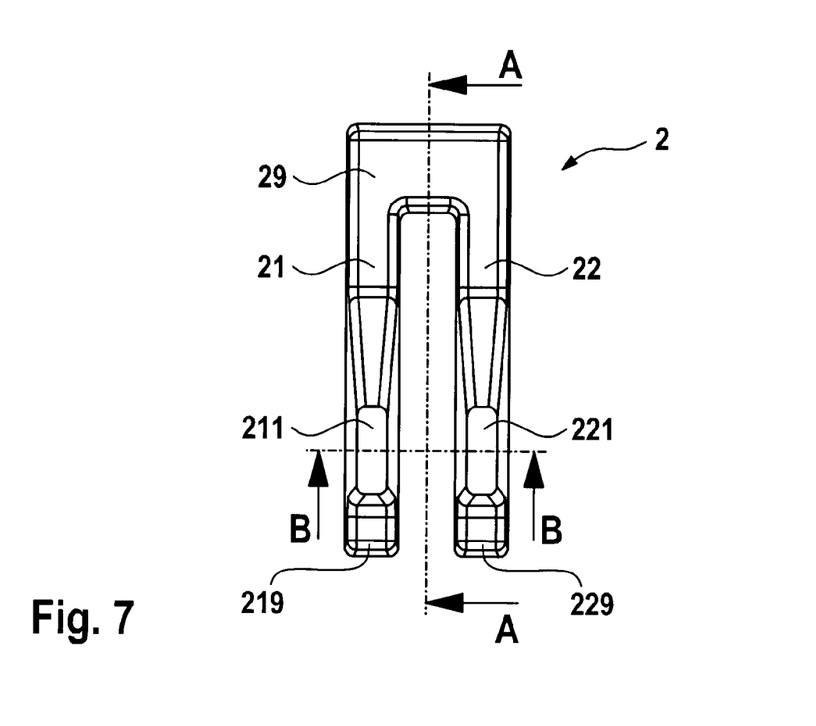
FIG. 7 the primary optic array according to FIG. 6 by way of a top view.
Figure 8:
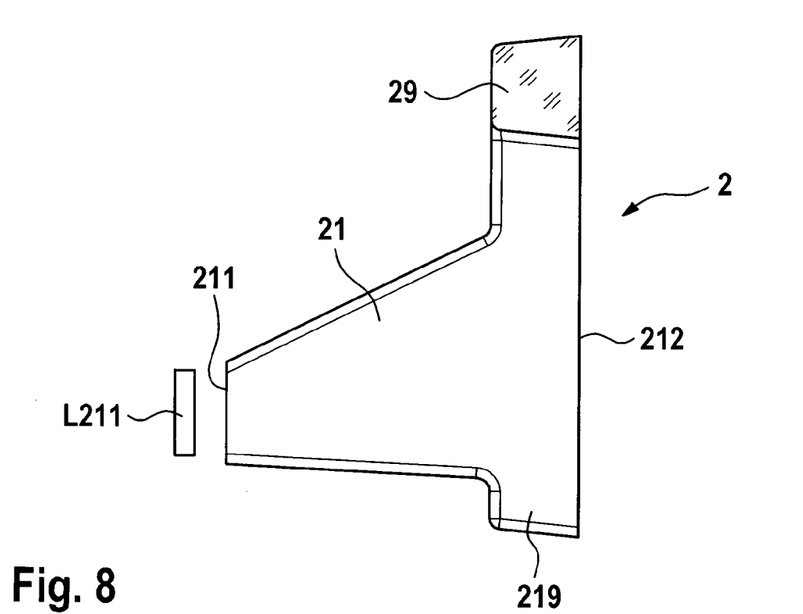
FIG. 8 the primary optic array according to FIG. 6 by way of a cross-sectional representation along section line A-A as represented in FIG. 7.
Figure 9:
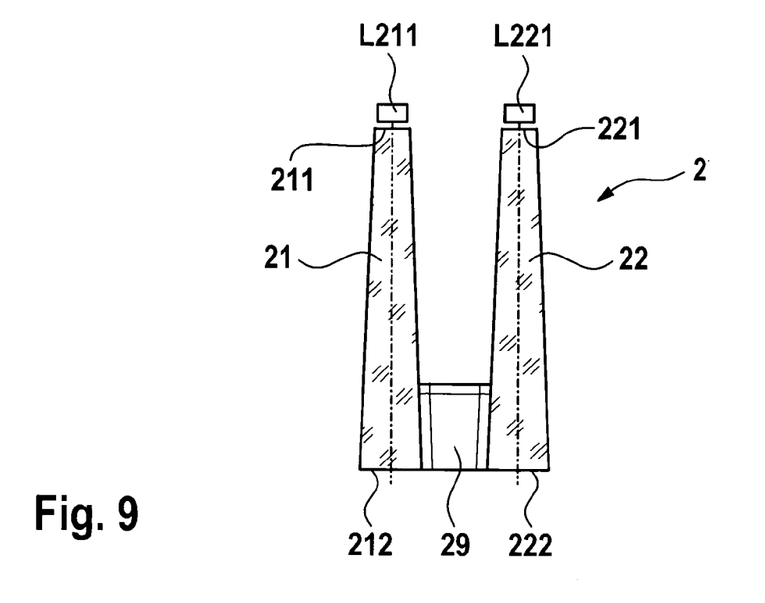
FIG. 9 the primary optic array according to FIG. 6 by way of a cross-sectional representation taken along a section line B-B as represented in FIG. 7.

FIG. 6 shows the primary optic array 2 by way of a perspective representation. FIG. 7 shows the primary optic array 2 by way of a top view. FIG. 8 shows the primary optic array 2 by way of a cross sectional representation along the sectional line A-A represented in FIG. 7, and FIG. 9 shows the primary optic array 2 by way of a cross sectional representation along the sectional line B-B represented in FIG. 7. The primary optic 21 comprises a light entry face 211 and a light exit face 212, as well as a web 219 arranged on the side facing away from the connection web 29 or on the opposing side of the light exit face 212 or the primary optic 21, respectively, and extending or prolongating the light exit face 212. The primary optic 22 comprises a light entry face 221 and a light exit face 222 as well as a web 229 arranged on the side facing away from the connection web 29 or on the opposing side of the light exit face 222 or the primary optic 22, respectively, and extending or prolongating the light exit face 222. The primary optic arrays 3, 4, and 5 are configured particularly in analogy to the primary optic array 2.

For manufacturing the optical element 100 the primary optic arrays 1, 2, 3, 4, and 5 are pressed (molded), in particular blank-moulded, bright-pressed or blank-pressed. Thereafter or subsequently, respectively, the primary optic arrays 2, 3, 4, and 5 are slid into the primary optic array 1 and fixed to form the primary optic array 1. It may be provided for that two or more optical elements corresponding to the optical element 100 are lined up.

The primary optics 21, 11, 22, 31, 12, 32, 41, 13, 42, 51, 14, and 52 comprise, between their respective light entry faces 211, 111, 221, 121, 131, 141 and their respective light exit faces 212, 112, 222, 122, 132, 142, bright-molded side faces at which light, that is irradiated through the respective light entry face 211, 111, 221, 121, 131, 141 are subject to total reflection. The side faces are so-called TIR-faces.

For implementing a motor vehicle headlight, LEDs are associated with the light entry faces 211, 111, 221, 121, 131, 141 of the primary optics 21, 11, 22, 31, 12, 32, 41, 13, 42, 51, 14, and 52 as, by way of example, has been represented in FIGS. 5 and 7. Herein, reference numeral L111 designates an LED associated with the light entry face 111, by means of which light is irradiated into the light entry face 111. Reference numeral L121 designates an LED, by means of which light is irradiated into the light entry face 121. Reference numeral L131 designates an LED, by means of which light is irradiated into the light entry face 131. Reference numeral L141 designates an LED, by means of which light is irradiated into the light entry face 141. Reference numeral L211 designates an LED, by means of which light is irradiated into the light entry face 211. Reference numeral L221 designates an LED, by means of which light is irradiated into the light entry face 221. Corresponding LEDs are associated with the other light entry faces, wherein there is particularly provided for that all of the LEDs or a part of the LEDs may be controlled separately or individually, respectively.

In an example of embodiment, the size of the LEDs is 1×4 mm. The light entry faces 211, 111, 221, 121, 131, 141 of the primary optics 21, 11, 22, 31, 12, 32, 41, 13, 42, 51, 14, and 52 amount to 1.2×5 mm. The distance from the light entry face to the light exit face amounts to 10 mm. Herein, the distance of a primary optic of a primary optic array to a neighbouring primary optic of a further primary optic array amounts to 0.1 mm. Thus, the distance between the primary optic 11 and the primary optic 21, for example, amounts to 0.1 mm. The distance between the primary optic 21 and the primary optic 12, for example, amounts to 0.1 mm.

Figure 10:
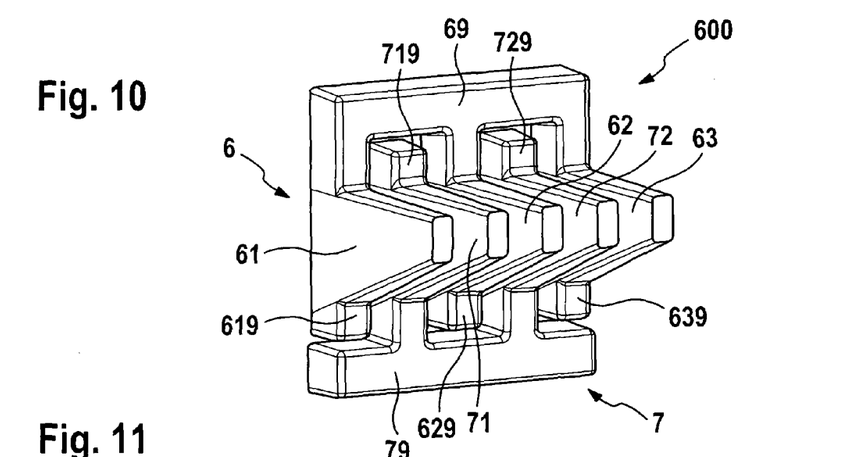
FIG. 10 an example of embodiment of an optical element configured alternatively in regard of the optical element according to FIG. 1, for a vehicle headlight or a motor vehicle headlight, respectively, by way of a perspective top view.

FIG. 10 shows an example of embodiment of an alternatively configured optical element 600 for a vehicle headlight or a motor vehicle headlight, respectively, by way of a perspective top view. The optical element 600 comprises a monolithically pressed primary optic array 6 of inorganic glass and a monolithically pressed primary optic array 7 of inorganic glass. The primary optic array 6 comprises a connection web 69, on which there are arranged a primary optic 61, a primary optic 62, and a primary optic 63. The primary optic array 7 comprises a primary optic 71 and a primary optic 72, which are arranged on a connection web 79.

The primary optic 61 comprises a light entry face and a light exit face as well as a web 619 arranged on the side facing away from the connection web 69 or the opposing side of the light exit face or the primary optic 61, respectively, and prolongating/extending the light exit face. The primary optic 62 comprises a light entry face and a light exit face as well as a web 629 arranged on the side facing away from the connection web 69 or the opposing side of the light exit face or the primary optic 62, respectively, and prolongating/extending the light exit face. The primary optic 63 comprises a light entry face and a light exit face as well as a web 639 arranged on the side facing away from the connection web 69 or the opposing side of the light exit face or the primary optic 63, respectively, and prolongating/extending the light exit face. The primary optic 71 comprises a light entry face and a light exit face as well as a web 719 arranged on the side facing away from the connection web 79 or the opposing side of the light exit face or the primary optic 71, respectively, and prolongating/extending the light exit face. The primary optic 72 comprises a light entry face and a light exit face as well as a web 729 arranged on the side facing away from the connection web 79 or the opposing side of the light exit face or the primary optic 72, respectively, and prolongating/extending the light exit face.

Figure 11:
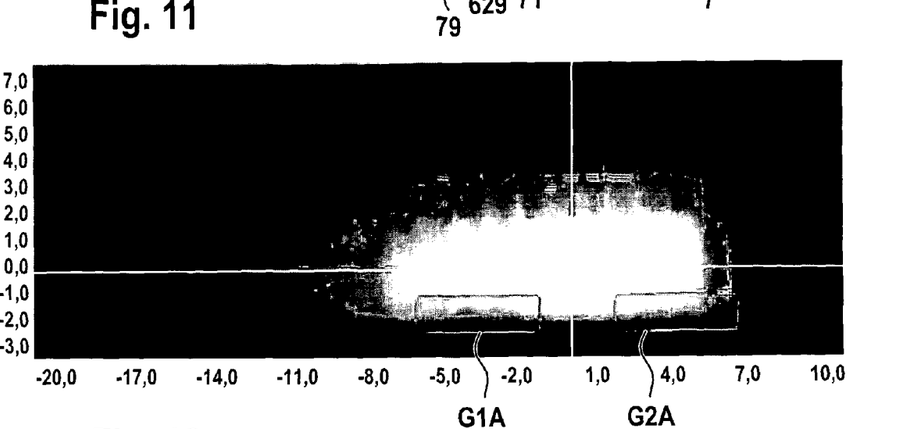
FIG. 11 a light distribution achieved by means of an optical element modified in regard of the optical element according to FIG. 10.
Figure 12:
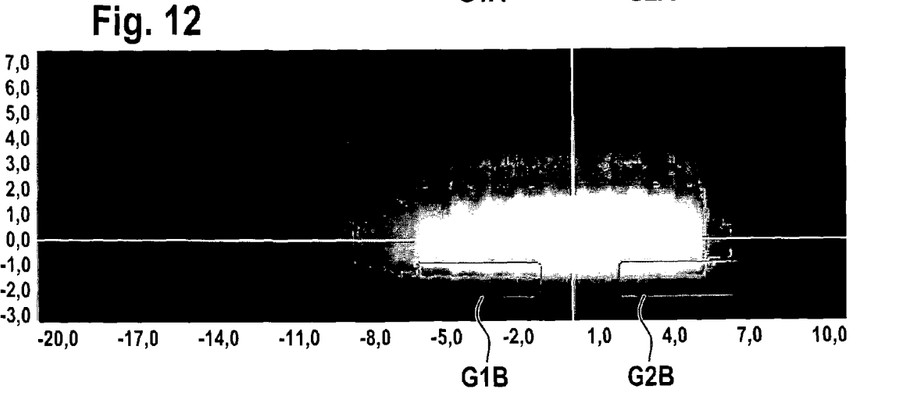
FIG. 12 a light distribution achieved by means of the optical element according to FIG. 10.

FIG. 11 shows a light distribution achieved by means of an optical element modified with respect to the optical element 600. The optical element used differs from the optical element 600 in that no webs 619, 629, 639, 719, or 729, respectively, have been provided for. For comparison reasons, there is shown in FIG. 12 a light distribution achieved by means of the optical element 600. The optical effect of the webs 619, 629, 639, 719, 729, into which no light is irradiated purposeful, is shown when comparing the region designated by the reference numeral G1A with the area designated by reference numeral G1B, or when comparing the region designated by the reference numeral G2A with the area designated by reference numeral G2B. A softer transition or gradient, respectively, between an illuminated area and a non-lighted region is achieved by means of the webs 619, 629, 639, 719, 729.

The invention claimed is:
1. An optical element for a vehicle headlight, in particular for a motor vehicle headlight, including a monolithically pressed first primary optic array of transparent material and at least one monolithically pressed second primary optic array of transparent material, wherein the first primary optic array comprises
- a first primary optic including a light entry face and a light exit face,
- at least one second primary optic including a light entry face and a light exit face, and
- a first connection web connecting the first primary optic mechanically to the second primary optic,
- wherein the first primary optic comprises, on its side facing away from or opposing, respectively, the first connection web, a first web extending the light exit face of the first primary optic, wherein the second primary optic comprises, on its side facing away from or opposing, respectively, the first connection web, a second web extending the light exit face of the second primary optic,
- herein the second primary optic array comprises
- a third primary optic including a light entry face and a light exit face,
- at least one fourth primary optic including a light entry face and a light exit face, and
- a second connection web connecting the third primary optic mechanically to the fourth primary optic,
- and wherein the first primary optic array and the second primary optic array are positioned and fixed with respect to each other such that they engage with each other such as to form an array, in which
  - the second primary optic is arranged between the third primary optic and the fourth primary optic, and
  - the third primary optic is arranged between the first primary optic and the second primary optic.

2. An optical element as claimed in claim 1, characterised in that the first primary optic, the second primary optic, the third primary optic and/or the fourth primary optic comprise/s, between its/their respective light entry face/s and its/their light exit face/s, a press-molded surface, in particular for the total reflection of light irradiated into the light entry surface.

3. An optical element as claimed in claim 1, characterised in that the distance
- between the second primary optic and the third primary optic amounts to no more than 0.5 mm;
- between the second primary optic and the fourth primary optic amounts to no more than 0.5 mm; and/or
- between the first primary optic and the third primary optic amounts to no more than 0.5 mm.

4. An optical element as claimed in claim 1, characterised in that a third primary optic array comprises, on its side facing away from or opposing, respectively, the second connection web, a third web extending the light exit face of the third primary optic.

5. An optical element as claimed in claim 1, characterised in that a fourth primary optic array comprises, on its side facing away from or opposing, respectively, the second connection web, a fourth web extending the light exit face of the fourth primary optic.

6. A vehicle headlight, in particular a motor vehicle headlight, characterised in that it includes an optical element according to claim 1 as well as a light source array for making light enter into the light entry face(s), said light source array comprising, in particular, an LED.

7. An optical element for a vehicle headlight, in particular a motor vehicle headlight, including a monolithically pressed first primary optic array of transparent material including a monolithically pressed second primary optic array of transparent material, and including at least one monolithically pressed third primary optic array of transparent material,
- wherein the first primary optic array comprises
  - a first primary optic including a light entry face and a light exit face,
  - at least one second primary optic including a light entry face and a light exit face, and
  - a first connection web connecting the first primary optic mechanically to the second primary optic,
- wherein the second primary optic array comprises
  - a third primary optic including a light entry face and a light exit face,
  - at least one fourth primary optic including a light entry face and a light exit face, and
  - a second connection web connecting the third primary optic mechanically to the fourth primary optic,
- wherein the third primary optic array comprises
  - a fifth primary optic including a light entry face and a light exit face,
  - at least one sixth primary optic including a light entry face and a light exit face, and
  - a third connection web connecting the fifth primary optic mechanically to the sixth primary optic,
- wherein the first primary optic array, the second primary optic array, and the third primary optic array are positioned and fixed with respect to each other such that they engage with each other such that they form an array, in which
  - the first primary optic is arranged between the third primary optic and the fourth primary optic,
  - the second primary optic is arranged between the fifth primary optic and the sixth primary optic, and
  - the fourth primary optic and the fifth primary optic are arranged between the first primary optic and the second primary optic,
- and wherein,
  - on its side facing away from or opposing, respectively, the first connection web, the first primary optic comprises a first web extending the light exit face of the first primary optic, and/or
  - on its side facing away from or opposing, respectively, the first connection web, the second primary optic comprises a second web extending the light exit face of the second primary optic, and/or
  - on its side facing away from or opposing, respectively, the first connection web, the third primary optic comprises a third web extending the light exit face of the third primary optic, and/or
  - on its side facing away from or opposing, respectively, the first connection web, the fourth primary optic comprises a fourth web extending the light exit face of the fourth primary optic, and/or
  - on its side facing away from or opposing, respectively, the first connection web, the fifth primary optic comprises a fifth web extending the light exit face of the fifth primary optic, and/or
  - on its side facing away from or opposing, respectively, the first connection web, the sixth primary optic comprises a sixth web extending the light exit face of the sixth primary optic.

8. An optical element as claimed in claim 7, characterised in that the distance
- between the first primary optic and the third primary optic amounts to no more than 0.5 mm;
- between the first primary optic and the fourth primary optic amounts to no more than 0.5 mm;

between the second primary optic and the fifth primary optic amounts to no more than 0.5 mm;

between the second primary optic and the sixth primary optic amounts to no more than 0.5 mm, and/or between the fourth primary optic and the fifth primary optic amounts to no more than 0.5 mm.

9. An optical element as claimed in claim 7, characterised in that the first primary optic, the second primary optic, the third primary optic, the fourth primary optic, the fifth primary optic, and/or the sixth primary optic comprise/s, between its/their light entry face/s and its/their light exit face/s, a press-molded surface, in particular for the total reflection of light irradiated into the light entry face.

* * * * *